Sept. 28, 1937.    G. A. WHITE    2,094,250
AUTOMATIC RECORD CHANGING PHONOGRAPH
Original Filed June 20, 1930    5 Sheets-Sheet 1

WITNESS:
Robt R Kitchel

INVENTOR
George A. White
BY Busser & Harding
ATTORNEYS.

Sept. 28, 1937.                G. A. WHITE                2,094,250
              AUTOMATIC RECORD CHANGING PHONOGRAPH
              Original Filed June 20, 1930    5 Sheets-Sheet 3

WITNESS:
Rob R Kitchel

INVENTOR
George A. White
BY
Busser + Harding
ATTORNEYS.

Sept. 28, 1937.　　　　G. A. WHITE　　　　2,094,250
AUTOMATIC RECORD CHANGING PHONOGRAPH
Original Filed June 20, 1930　　5 Sheets—Sheet 5

INVENTOR
George A. White
BY
Busser & Harding
ATTORNEYS

Patented Sept. 28, 1937

2,094,250

UNITED STATES PATENT OFFICE 2,094,250

AUTOMATIC RECORD CHANGING PHONOGRAPH

George A. White, Philadelphia, Pa., assignor, by mesne assignments, to Lloyd H. Smith, New York, N. Y.

Application June 20, 1930, Serial No. 462,456
Renewed January 31, 1935

13 Claims. (Cl. 274—10)

This invention relates to a phonograph and particularly a phonograph embodying mechanism for automatically changing records.

Heretofore various types of record changing phonographs have been produced. These phonographs, however, are quite expensive and complicated and are adapted to handle only perfect records, since the record handling devices are of a positive nature and will break those records which deviate even slightly from standard dimensions. As is well known, the compositions from which records are made are liable to deformation and warping and it is also impossible to mold these compositions to a very high degree of accuracy. Furthermore the various makers of records do not make them of standard dimensions although they do approximate standard dimensions. As a result, the automatic phonographs which have been heretofore made break a large number of the records which they are handling. Since the mechanisms of such phonographs are frequently exposed, they are very often jammed or rendered inoperative by the broken pieces of the records which may fall therein.

It is the broad object of the present invention to provide an automatic phonograph which avoids the various objections noted above, being simple in construction, and accordingly inexpensive, and automatic, taking care of various records approximating standard size even though they may vary in exact size due to variations in manufacture, or warping.

More specifically it is the broad object of the present invention to provide a phonograph from which the record to be removed is merely released and permitted to discharge under the action of gravity and rotation, or at any rate, by some means which will operate independently of the dimensions of the record.

A further object is the provision of a phonograph mechanism which will handle records of varying standard sizes, for example, a mixture of ten and twelve inch records. In the preferred form of the invention, the machine takes care of the various records automatically.

A further object of the invention relates to the provision of a repeat mechanism whereby a change of records may be avoided at the will of the operator. It is also possible to cause the present mechanism to operate in a non-automatic manner.

Other objects of the invention relating particularly to details include the provision of a pick-up element in which the needles may be readily changed, a novel clutch for throwing into operation the automatic record changing mechanism and the provision of a switch adapted to be set into operation as the tone arm approaches the end of the record.

Other objects of the invention relating particularly to details of construction will be apparent from the following description read in conjunction with the accompanying drawings, in which.

Figure 13:
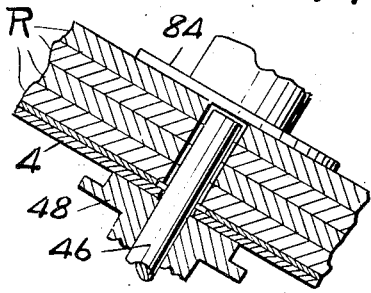
Figure 14:
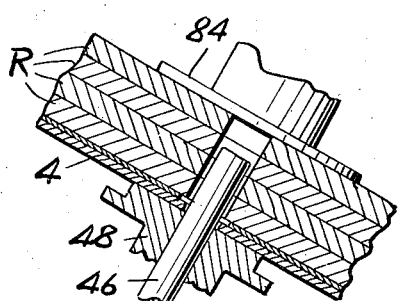
Figure 15:
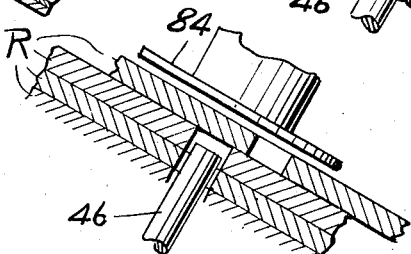

Figs. 13, 14, and 15 are digrammatic sectional views showing the operation of the mechanism in discharging a record.

The mechanism, of which a preferred form is illustrated, comprises a frame 2 consisting primarily of a top plate and associated brackets adapted to support the various parts of the mechanism. The frame forms a unit which is adapted to be inserted in a suitable cabinet, as will be later described. The phonograph mechanism forming the subject of the present invention is particularly adapted for use in connection with an electrical amplifying system which may, in some instances, comprise the audio amplification stages of a radio set contained in the same cabinet with the phonograph, or in a separate cabinet. The records which are to be played are supported upon a suitable turntable 4 provided with the usual friction surface to insure rotation of the records during playing. This turntable is mounted in a manner which will be hereafter more fully described. The needle 6, adapted to follow a groove in a record being played, is carried by the pick-up or reproducer 8 illustrated as of the electrical variety from which suitable electrical connections extend to the amplifying system. The pick-up 8 is carried at the end of the tubular tone arm 10 through which the connecting wires pass, the tone arm being provided with a suitable sleeve concentrically mounted in the end of the tube 10 and provided with a pin 12 projecting through a quadrantal slot 14 in the tone arm. The arrangement is such that normally the pick-up occupies the position illustrated in Fig. 6, the pin then being located in the bottom portion of the slot. The pick-up is normally maintained in this position by friction, but may be readily turned through a right angle so that the needle will be pointing toward the front of the machine and be readily accessible to the operator for changing. The pick-up is held in this position also by friction.

Figure 4:
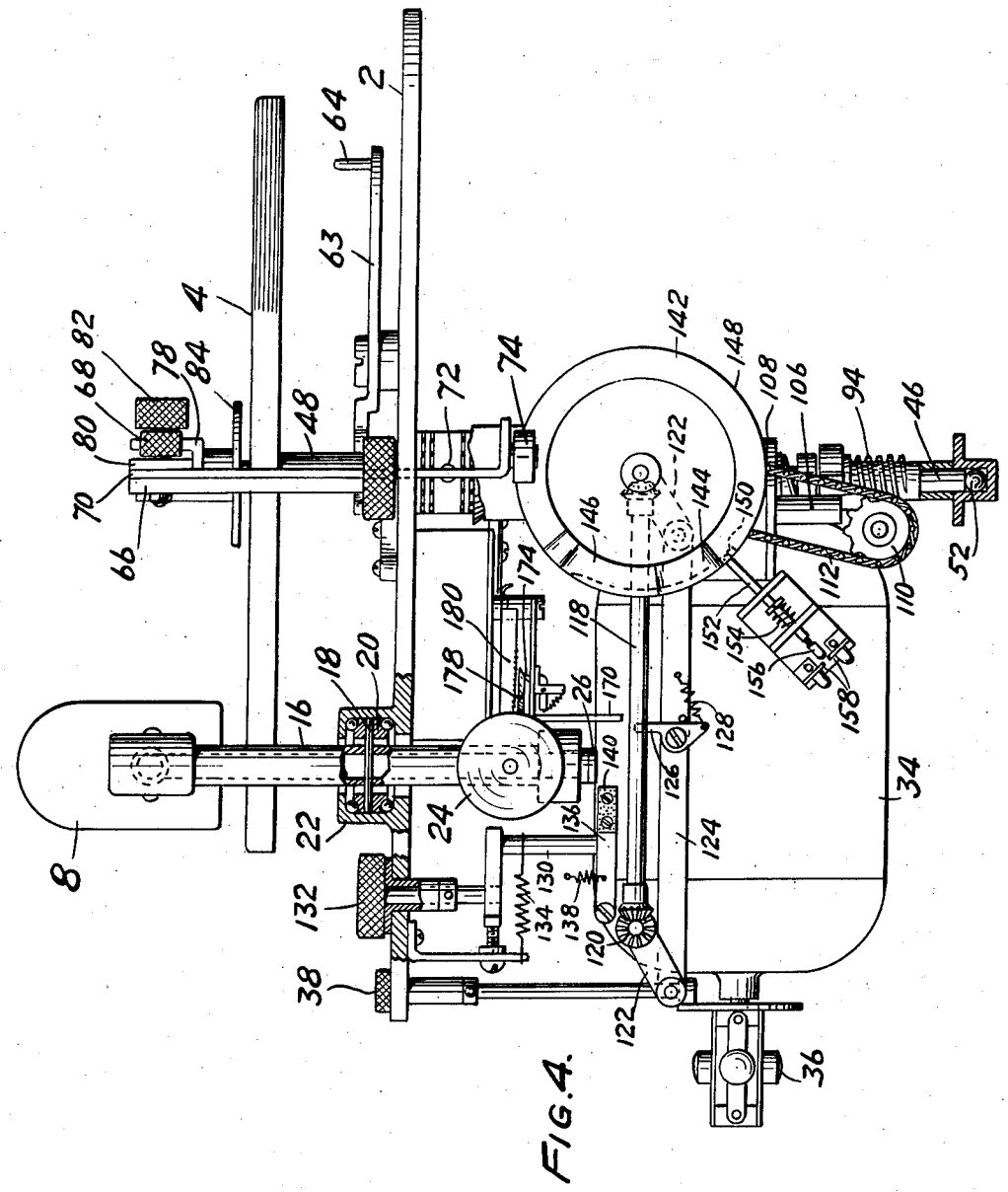
Fig. 4 is a vertical section of the mechanism taken substantially on the plane indicated by the line 4—4 of Fig. 1, certain other parts being shown in section.
Figure 5:
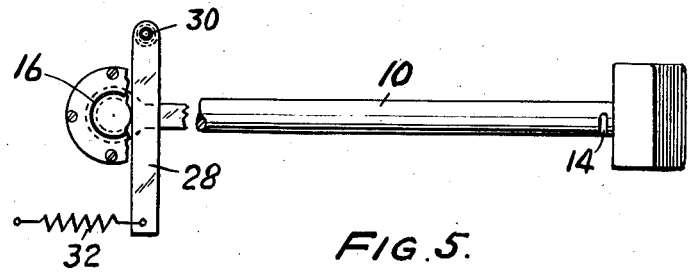
Fig. 5 is a plan view illustrating details of the tone arm and its mounting.

The arm 10 is connected at its rear end with a downwardly extending tubular member 16 which is pivoted on a transverse rod 18 carried by an annular ring 20 mounted in ball bearings in a housing 22 formed in the frame. (See Fig. 4.) By reason of this mounting, it will be obvious that the pick-up has both vertical and horizontal components of motion so that it may move in a vertical direction to move the needle into or out of engagement with a record and may also traverse the record as is necessary during playing. The construction of the bearing for the arm is such that the downward movement of the pick-up unit is limited so that the needle may drop only a short distance below the level of a topmost record and so that when the pick-up unit is turned sidewise it clears the record. A counterweight 24, which is preferably adjustable, serves to completely balance the tone arm in the normal sloping position of the mechanism so that it is necessary to provide other means for urging the pick-up needle into suitable engagement with the record. This means is illustrated in Fig. 5 and comprises a lever 28 pivoted to the frame, as indicated at 30, and urged by a spring 32 into engagement with the tubular member 16 below its pivot. This arrangement is preferable to the use of an unbalanced tone arm assembly, since there is no tendency for the pick-up to ride inwardly or outwardly over the record and thus possibly jump between adjacent grooves. An arm 26 extends from the bottom of the tubular member 16 to be engaged by suitable mechanism for restoring the tone arm to initial position relative to a record.

To drive the mechanism there is provided a motor 34 which is preferably of an induction type where the phonograph is of the electrical variety, since there is thereby avoided any sparking which may produce audible noises when amplified by the amplifying system. This motor 34 is provided with the usual governing means, illustrated at 36, adjustable through the member 38 extending above the top plate of the frame. By adjustment of this member 38, the speed of the motor may be varied.

Figure 3:
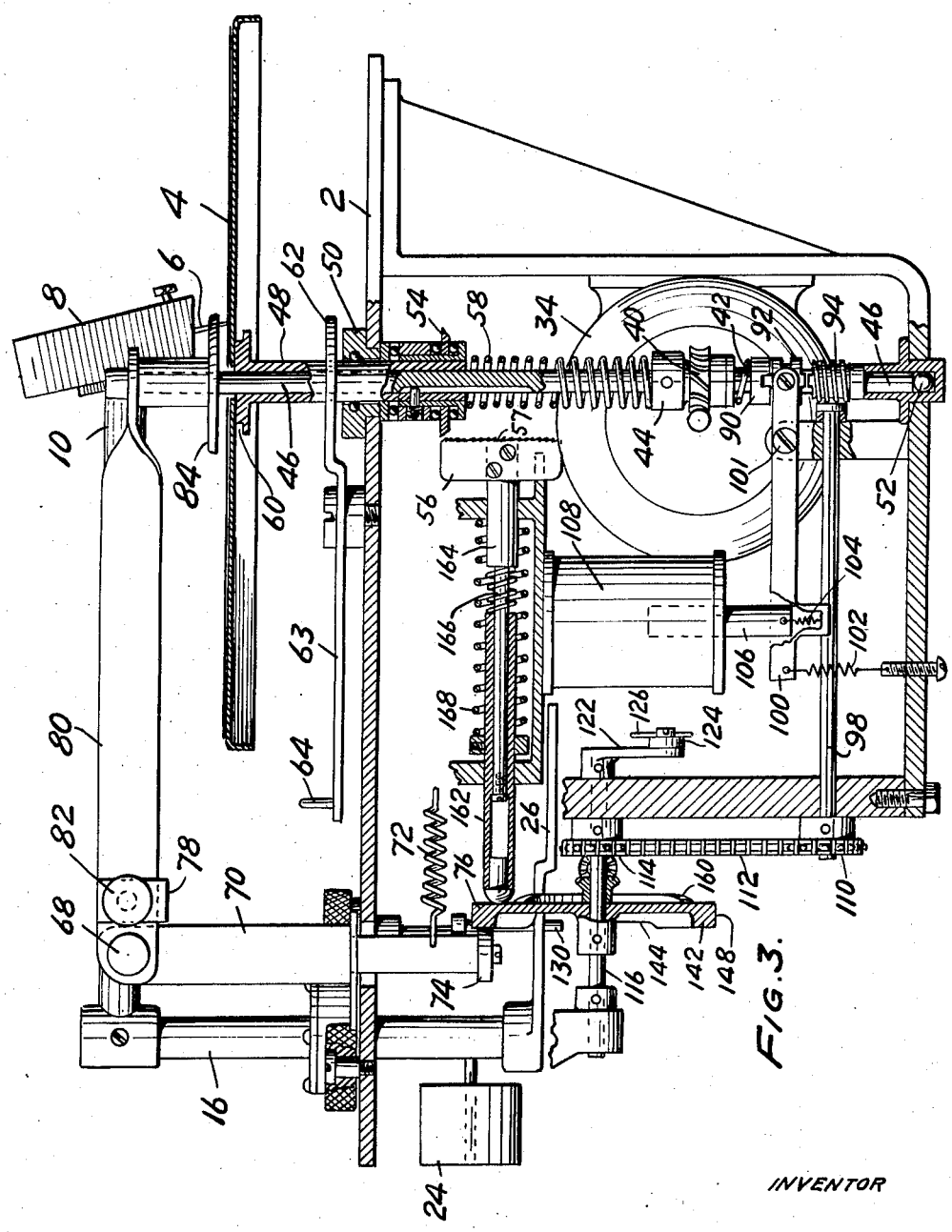
Fig. 3 is a vertical section taken substantially on the plane indicated by the line 3—3 of Fig. 1.

The motor carries a worm meshing with the worm-wheel 40, which is yieldingly urged upwardly as viewed in Fig. 3, by a spring 42 to frictionally engage it with a collar 44 secured to the main driving shaft 46. Suitable friction surfaces are provided between the worm-wheel 40 and the collar 44 to insure proper driving. The frictional drive constitutes a safety device to prevent possible damage to the mechanism in case, for example, the turntable is manually restrained from movement.

A sleeve 48, which supports the turntable 4, surrounds the shaft 46 and passes through a suitable ball bearing 50 carried by the frame, which, together with the ball step bearing 52 on which the shaft 46 rests, serves to support the turntable and the other parts associated with the shaft. The sleeve 48 is slidable vertically relative to the shaft 46, being splined thereto by a suitable pin and slot connection so as to rotate in all positions of adjustment with the shaft. Carried vertically with the sleeve and mounted in suitable ball bearings therein so that it may remain stationary while the sleeve is rotating, is a locking disc 54 having a sharp periphery engageable with the ratchet teeth 57 carried by a member 56. It will be noted that the teeth 57 point downwardly so that when the teeth are yieldingly pressed into engagement with the disc 54, the disc 54 may be pressed freely outwardly but will be prevented from rising. The teeth 57 are quite small so that the disc 54 may be arrested in substantially any position which it may assume.

A spring 58 reacts between the sleeve 48 and the collar 44 to normally urge the turntable 4 to the uppermost position determined by the splined connection between the sleeve and the shaft, which position is substantially as illustrated in Fig. 3. In order to hold turntable 4 in its lowermost position for loading purposes, the upper end of the sleeve is provided with an annular slot, indicated at 60, engageable by the hook end 62 of the lever 63 which at its opposite end is provided with a pin 64 which may be manually engaged by the operator.

Figure 1:
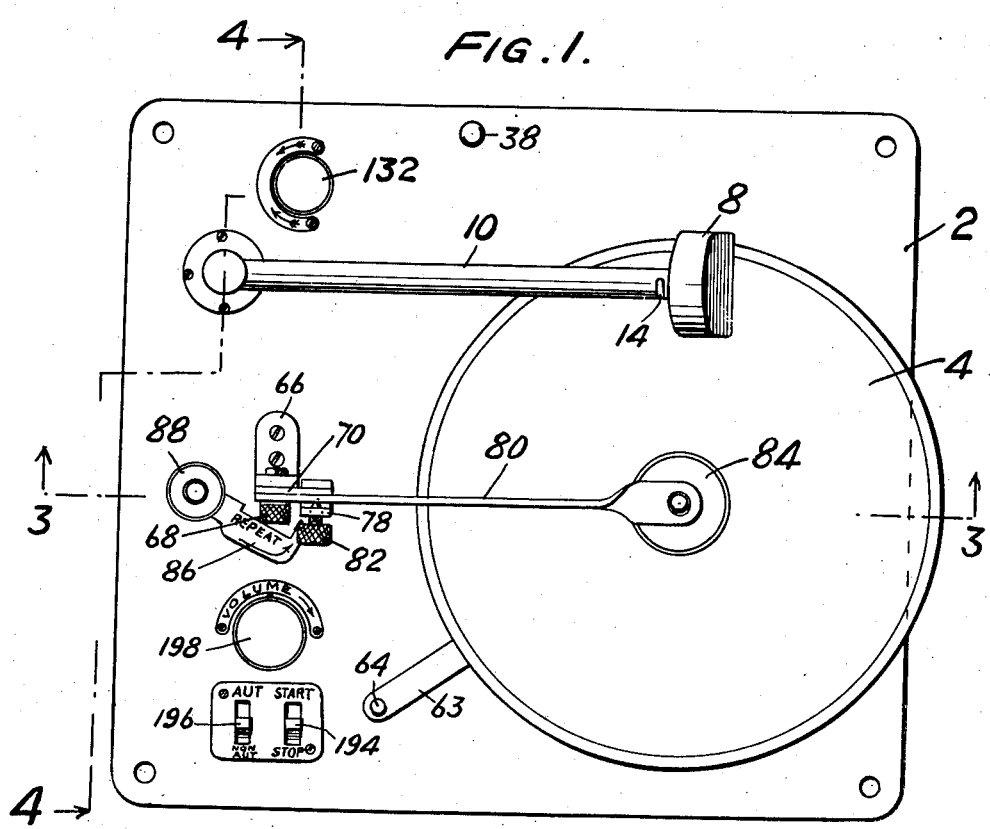
Fig. 1 is a plan view of the mechanism of the improved phonograph.

Referring to Figs. 1 and 3, there is provided an upstanding bracket 66 to which is pivoted at 68 a lever 70 urged in a counterclockwise direction, as viewed in Fig. 3, by spring 72 to bring the cam follower roller 74, which it carries, into engagement with suitable cams formed on the face of a cam disc 76. At its upper end the lever 70 is provided with a bracket 78 adapted to receive the record arm 80 which may be engaged fixedly therein by a thumb screw 82 so as, in effect, to form an integral part of the lever 70 during operation of the machine. When loading records into the machine, the thumb screw 82 may be withdrawn from the arm 80 so that the arm may be moved upwardly about 68 as pivot. A retaining disc 84 is mounted in suitable ball bearings in the free end of the arm 80. While the arm 70 is normally constrained by the spring 72 to follow the movements imparted thereto by the cam surfaces on the disc 76, a member 86 is provided to engage the arm 70 to retain it in a retracted position against the tension of spring 72. The member 86 is adapted to be manually moved into or out of engagement with the arm 70 by a knurled knob 88. As will be pointed out hereafter, this device permits repeating of a record.

As illustrated in Fig. 3, the shaft 46 has fixed thereto a collar 90 provided with upwardly extending slots adapted to receive teeth on the clutch member 92 which is vertically movable relative to the shaft to bring downwardly extending teeth carried thereby into engagement with upwardly extending teeth carried by the worm 94 which is journalled freely on the shaft and meshes with a worm-wheel 96 carried by a cross shaft 98. The clutch element 92 is moved upwardly or downwardly to respectively disengage it from or engage it with the worm 94 by a lever 100 provided with a forked end carrying pins engageable within an annular groove in member 92. The lever 100, which is pivoted to the frame at 101, is normally urged in a counterclockwise direction by a spring 102, the tension of which is adjustable. It is moved in opposition to the spring 102 to effect rotation of the worm 94 with the shaft 46 by a spring connection 104 with a plunger 106 forming the armature of the coil 108. The purpose of the spring connection 104 rather than a non-yielding connection of the plunger with the lever 100, is to prevent chattering when the solenoid 108 is energized by alternating current.

On the end of cross shaft 98 is secured a sprocket wheel 110 about which is trained a chain 112 engaging a sprocket wheel 114 carried by a cam shaft 116. A stub shaft 120 parallel with the shaft 116 is rotated in timed relationship therewith through the medium of the connecting shaft 118 and suitable pairs of bevel gears. The shafts 116 and 120 carry similarly angularly disposed arms 122 to which is pivoted a connecting link 124 which, by reason of its connection, always remains parallel with the plane of the shafts 116 and 120. The link 124 carries a pawl 126 of the type illustrated in Fig. 4 and which is normally urged in a counterclockwise direction against a limiting stop by a spring 128, its normal position being as shown in Fig. 4.

During operation of the machine at the time when the tone arm is being moved back to the start of the groove of a new record, the link 124 is moved by the rotation of the arms 122 so that it first engages the arm 26, lifting it upwardly to disengage the needle 6 from the previously played record, which is thereafter discharged. As the circular movement of link 124 proceeds, the pawl 126 engages the arm 26 serving to move the pick-up to the outermost portion of the new record, its movement in this direction being limited by a suitable stop 130. As soon as the arm 26 engages this stop, the pawl 126 yields and slides thereunder. Thereafter the link 124 moves downwardly in its cycle of movement, permitting the needle 6 to engage the beginning of the groove in the new record. For the sake of simplicity in the mechanism illustrated, there has been shown a manually adjustable limiting means for determining the extreme outward position of the pick-up. The means consists of the pin 130 carried by the knurled member 132 manually operable above the top plate of the frame so that the pin may be moved to either of two alternative positions, whereby the pick-up unit will be stopped in the position for cooperation with the beginning of the groove of either of two different standard size records, for example, either a ten inch record or a twelve inch record. A spring 134 cooperates to yieldingly hold the pin 130 in either of its limiting positions and is arranged so as to pass from one side to the other of the center of rotation of the member 132 as it moves between the two limiting positions.

In order to prevent the tone arm from sliding inwardly from the edge of a record so rapidly as to possibly jump the initial grooves, an arm 136, pivoted to the frame and yieldingly held upward by a spring 138 against a suitable stop, is provided with a friction pad 140 arranged to lightly engage the arm 26 carried by the tone arm.

The cam 76 carried by the shaft 116 is provided with three sets of operating cam surfaces. It is provided on one face, namely, the left-hand as viewed in Fig. 1, with an outwardly facing series of cam surfaces 142, 144, and 146, the first being the highest and extending through approximately 280°, the second being of intermediate height and extending approximately 30°, and the remaining cam surface constituting the face of the disc and extending through approximately 50°. Accordingly, during normal action the roller 74 and accordingly the record retaining disc 84 may occupy three different positions, the purpose of which will be hereafter pointed out.

The periphery of the cam disc also provides a cam surface 148, a portion of which is grooved, as indicated at 150. The surface 148 and the groove 150 are engaged by a pin 152 normally urged by a spring 154 thereagainst and provided at its outer end with a conductive portion 156 insulated from its major portion and engageable simultaneously with spaced contacts 158 so as to close a circuit the terminals of which are connected to the two contacts. When the pin 152 is engaged within the groove 150, the contact is broken and when the pin is engaged with the periphery of the disc the contact is made.

On the right-hand side of the cam disc 76, as illustrated in Fig. 3, is a cam 160 having an extent of approximately 95° and arranged to engage the end of a plunger 162 slidably mounted in the frame and telescoped with a second plunger 164 also mounted in the frame and carrying the detent element 56. A spring 166 normally urges the two plungers apart while a spring 168 reacts between the portion of the frame and a collar on the plunger 162 to engage it with the cam 160. By reason of this construction, as the cam 160 engages the plunger 162 and moves it to the right, the detent element 56 is yieldingly moved into engagement with the disc 54 whereby the teeth 57 are engaged with the sharp edge of the disc.

Although the spring 166 urges the two plungers apart, it will be noted that a screw on the end of the plunger 164 is provided with an outwardly extending head engaging a shoulder within the plunger 162 to limit such movement. Accordingly the two plungers will move as a unit under the action of spring 168.

Figure 7:
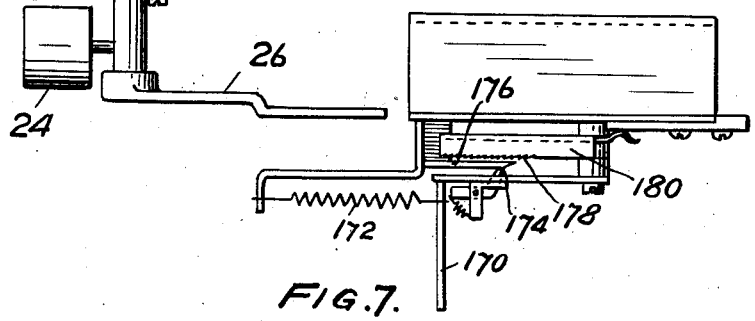
Fig. 7 is a front elevation of a switch mechanism.
Figure 8:
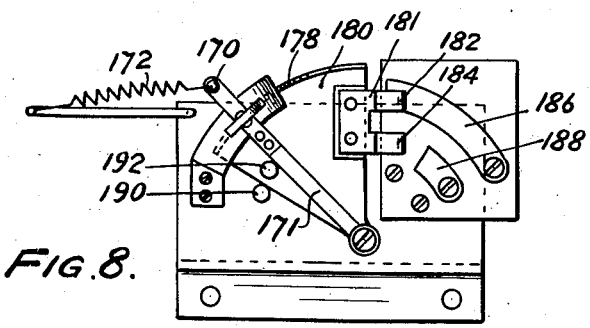
Fig. 8 is a bottom plan view of the same.

Referring now to Figs. 7 and 8, and Fig. 4, which illustrates the relationship of the mechanism of Figs. 7 and 8 to the rest of the machine, there is illustrated a pin 170 carried at the outer end of an arm 171 pivoted to a supporting plate carried by the frame. A spring 172 connected to the pin 170 and to a fixed member urges the lever normally to the position illustrated in Fig. 8. The lever 171 carries a spring pressed pawl 174 which in the position shown in Figs. 7 and 8 rests upon a fixed guard member 176 which prevents the pawl in its fully retracted position from engaging the teeth 178 of a segmental plate 180 carrying a switch element 181 provided with contact prongs 182 and 184, the former of which constantly engages a conductive segment 186 and the other of which is adapted to engage a conducting element 188, both carried by insulating material. In the position illustrated, the arm 171 engages a pin 192 carried by the segmental plate 180 whereby the plate is drawn to a position in contact with a stop pin 190 carried by the supporting plate.

The pin 170 is located in position to be engaged by the arm 26 carried by the tone arm so as to be moved thereby in a clockwise direction, as viewed in Fig. 8, as the needle approaches the end of the groove in the record. As the needle approaches the end of the groove, the arm 171 is moved away from the stop pin 192 and the pawl 174 slides off the end of the guard plate 176 and engages the teeth 178 formed at the edge of the segment. If the record is of a type having a groove extending to a considerable distance inwardly, in order to cause operation of the usual automatic stops, the engagement of the pawl 174 with one of the teeth 178 will move the segment to the right until element 184 engages 188 and closes a circuit one terminal of which is connected to element 188 and the other terminal of which is connected to the element 186. If, on the other hand, the record is of the type having an eccentric groove at the end of the spiral groove, the arm 171 will have imparted thereto by the oscillations of the tone arm an oscillating movement which will, through the medium of the pawl, move the segment step by step in a clockwise direction until closure of the switch takes place. The oscillating movement imparted to the arm 171 is of such short range that stop pin 192 will not be engaged and accordingly the movement of the segment will be unidirectional.

When the tone arm is moved outwardly to bring the needle into the beginning of the groove of another record in the manner which will be later described, the arm 26 moves away from the pin 170 and permits it to move under the action of spring 172 in a counterclockwise direction, whereupon it first engages stop pin 192 and carries the segment with it so as to break the contact between 184 and 188 and thereafter brings the segment into engagement with stop 190.

Referring now to Fig. 1, which illustrates the visible portion of the machine when in use, it will be seen that there are provided two manually operable switches 194 and 196, the former being closed to start the mechanism and opened to stop it and the latter being closed to effect automatic operation and opened to effect non-automatic operation in the manner which will be later described. Also mounted above the top plate is a volume adjusting knob 198 which is arranged to control the audio amplifying system in the usual fashion as, for example, by producing a variation of a potentiometer.

Figure 2:
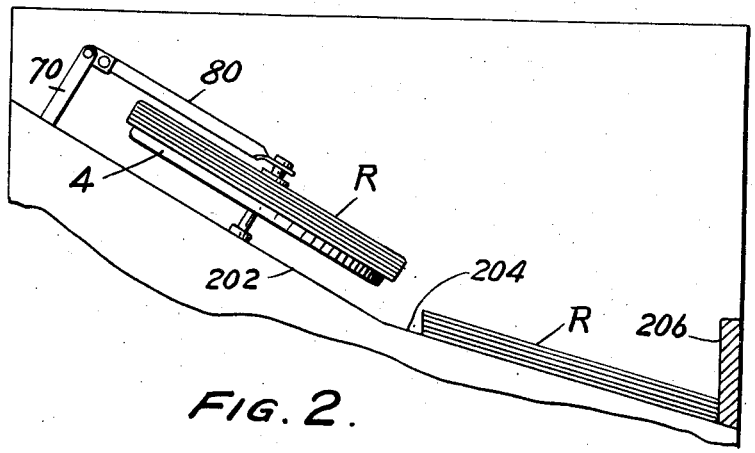
Fig. 2 is a view more or less diagrammatic illustrating the mounting of the mechanism in a suitable cabinet therefor.

Reference to Fig. 2 will illustrate the relationship of the mechanism to the cabinet which houses it. The cabinet, besides housing the phonograph mechanism, may house a radio set the audio amplifying stages of which may be used for amplifying the radio signals as well as the signals from the pick-up unit. In other cases the cabinet may be of quite small size, serving only to form a housing for a phonograph mechanism, the output from the pick-up unit being adapted to be fed into the audio amplifying system of a separate radio set. Alternatively an audio amplifying system designed for the phonograph alone may be incorporated within the cabinet. The cabinet which is illustrated at 200 is provided with a sloping surface 202, in which the phonograph unit is mounted, the top plate thereof being substantially flush with this surface. The mounting is such that the plane of the top of the turntable forms an angle with the horizontal such that records may slide from the turntable upon a sloping receiving surface 204 formed in the cabinet, soft shock absorbing material 206 being provided to break the force of impact of the record with the side of the cabinet. The arrangement is such that the tone arm 10 will normally hang downwardly when about midway of its range of movement. In other words, the left-hand edge of the plate illustrated in Fig. 1 will be uppermost. The angle at which the turntable is set may vary within wide limits but is, of course, necessarily such that a record will slide from the top of a stack of records while the stack is rotating, the sliding movement being preferably as slow as possible so as to eliminate any possibility of chipping the edges of the record. As will be described hereafter, it will be noted that the records which are to be discharged from the stack pass from the top thereof and rest upon any records previously located on surface 204.

By reason of the fact that the tone arm 10 is counterbalanced by the weight 24, it has no substantial tendency to assume any definite position by reason of the sloping condition of the mechanism. The lever 28 insures constant and adequate pressure of the needle within the groove without causing the needle to rotate inwardly or outwardly of the record so that it is free to follow the groove without having any tendency to jump between the adjacent convolutions of the groove. Any oscillatory movement imparted by an irregularity in the record is further damped out by reason of the provision of the pad 140.

Figure 9:
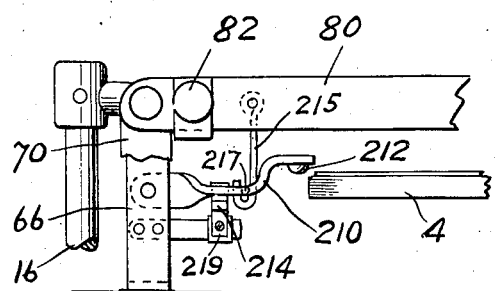
Fig. 9 is a front elevation illustrating the automatic means for taking care of records of different sizes, this means being omitted from the other views for the sake of clearness.
Figure 10:
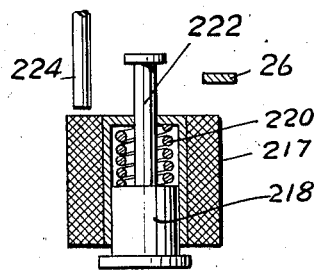
Fig. 10 is a diagrammatic sectional view illustrating the controlling mechanism associated with the mechanism of Fig. 9.

There has been above described a manual adjustment for producing a proper cooperation of the needle with the beginnings of the grooves of different sized records. In Figs. 9 and 10 there is illustrated a mechanism for automatically effecting proper position of the needle with respect to an uppermost record in a stack which may contain, instead of records all of the same sizes, intermixed records of different sizes. The mechanism illustrated in these figures is adapted to be applied to the mechanisms identically as shown in Figs. 3 and 4 with the exception that the manually adjusted pin 130 and its associated elements would be removed and the mechanisms of Figs. 9 and 10 substituted. These automatic mechanisms were omitted from Figs. 3 and 4 for the sake of clearness.

Referring first to Fig. 9, there is illustrated an arm 210 pivoted to the bracket 66 which supports the pivot 68. This arm 210 carries at its outer end a feeler 212 which may be in the form of a polished knob or a wheel, or the like, adapted to engage the upper surface of an uppermost record adjacent its periphery. The arm 210 carries a contact 214 arranged to engage a contact 216 fixedly carried by the bracket 66, both of the contacts being insulated from their supporting members. A link 215 pivoted to the arm 80 is provided with a hook end embracing a pin 219 fixed to the arm 210. By reason of this arrangement, lifting of the arm 80 for the purpose of stacking records upon the turntable serves automatically to lift the arm 210 so that it is not in the way of records being played on the turntable. During operation of the machine the hook is in such position as not to affect upward or downward movement of the arm 210.

The feeler 212 is so located that if a small sized record is uppermost, it will not engage the edge thereof and accordingly the arm 210 will be free to drop, closing the contact between 214 and 216. On the other hand, if a large sized record is uppermost on the turntable, the feeler 212 will engage its top surface and be held in raised position so that the contact at 214—216 is broken. The arrangement is, of course, such that the feeler will cooperate with the top record only and will not, for example, engage the periphery of a larger record located beneath an uppermost smaller record.

A pin 224 is fixed to the machine and is located in a position corresponding with the outermost adjusted position which in the manual arrangement would be occupied by the pin 130. Located with its axis in alignment with the inner adjusted position which would be assumed by the pin 130 is a solenoid 217 provided with a plunger 218 normally urged outwardly by a spring 220 and carrying an upwardly extending pin 222, both the pins 222 and 224 being located in the path of movement of the arm 26 and in positions, as has been stated, corresponding to the two adjusted positions of the pin 130 in the manually adjustable modification. If a small size record is located uppermost on the turntable, the contact will be made between 214 and 216, closing a circuit through the solenoid 217 and thereby causing the plunger 218 to assume its uppermost position in the path of the arm 26 so that the arm will be stopped and the needle lowered into contact with the outermost convolution of the groove of the small record. On the other hand, if a large record is uppermost, contact will not be made between 214 and 216 and the solenoid will remain deenergized with the pin 222 in lower position out of the path of the arm 26, which will be stopped by the pin 224 so that the needle will be dropped into the outer end of the groove of the large record.

Figure 12:
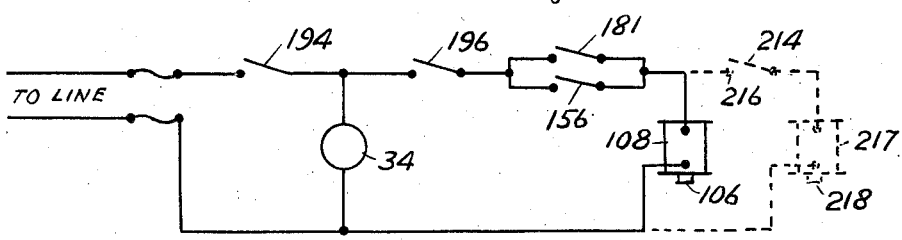
Fig. 12 is a wiring diagram of the mechanism.

The wiring diagram of the machine is illustrated in Fig. 12, in which it will be seen that the switch 194 controls the circuit to the motor 34 as well as the other electric elements of the mechanism, while the switch 196 controls the automatic mechanism. The circuit, including the contacts 214 and 216 and the solenoid 217, is illustrated in dotted lines. This circuit is, of course, omitted when a manual adjustment is used. It will be noted that the switches 156 and 181 are in parallel so that closure of either will energize the solenoid 108.

Figure 11:
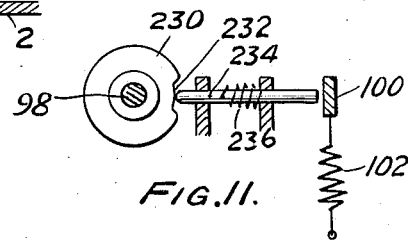
Fig. 11 is a sectional view illustrating a modified detail of the mechanism.

Referring now to Fig. 11, there is illustrated therein a modified arrangement of details whereby the switch 152 may be eliminated and prolonged excitation of the solenoid 108 avoided. In this arrangement the shaft 98 carries a cam 230 provided with a depression 232 in its periphery. Arranged to ride on the periphery and into the depression 232 is a pin 234 yieldingly urged into contact with the cam by a spring 236 and arranged so that its path of movement intersects the path of movement of the lever 100. If the lever 100 is initially raised by energization of solenoid 108 above the path of the plunger 234, the shaft 98 will be rotated by engagement of the clutch members 92 and 94. When this rotation takes place, the cam 230 will force the plunger below the lever 100 so that even though the solenoid is thereafter deenergized the plunger will prevent downward movement of the lever and will thereby maintain the clutch engaged. As soon as the shaft 98 finishes a complete revolution, the plunger will ride into the depression 232, thereby permitting the lever 100 to drop and disengage the clutch.

The operation of the phonograph will now be described in detail. Prior to loading, the switch 194 will, of course, be open and accordingly all of the electrical elements will be deenergized. The turntable 4 will be depressed to its lowermost position and latched there by engagement of arm 62 with slot 60. The arm 80 will be raised to an upper position, being liberated from arm 70 by freeing screw 82, and will be held in such position by friction at the pivot 68. If the mechanism illustrated in Fig. 9 is incorporated in the machine, this will also be moved, upon raising arm 80, to an inoperative position where it will not interfere with the loading of the turntable. The tone arm 10 will be in its outermost position with the pick-up 8 turned through a right angle so as to be spaced from the topmost record which may be placed on the table. The cam following roller 74 and pin 152 will engage cam surface 142 and slot 150 in the positions substantially as illustrated in Fig. 4. By reason of the position of the tone arm, the switch 181 is also open at this time.

The desired number of records may now be placed in the turntable, the arm 80 lowered until the disc 84 occupies the normal position illustrated in Fig. 13 and then clamped by tightening screw 82, and the latch lever 63 released whereupon spring 58 will raise the table until the topmost record engages the disc 84, the stack of records being thereby clamped between the disc 84 and the turntable as shown in Fig. 13. The pick-up needle is then set at the beginning of the groove of the record. If the mechanism illustrated in Figs. 3 and 4 is used, not having the automatic arrangement for stopping the arm, the stop pin 130 is set to agree with the second record from the top. If all the records in the stack are of the same size it will be unnecessary to change this setting throughout the playing of the entire series.

Assuming first that automatic action is desired, both switches 194 and 196 may now be closed, detent 86 being, of course, in retracted position. The topmost record will then be played, the pick-up travelling inwardly as the needle follows the groove. Any excessive movement of the tone arm at the beginning of the record is damped by reason of the provision of friction pad 140, whereby any tendency for the needle to jump across the grooves is restrained. During this playing of the record, the clutch 92 remains disengaged so that no motion is imparted to shaft 98.

The next event in the cycle of operation occurs at the end of the record. If the record is of the type provided with a continuous eccentric groove at the end of its spiral, the arm 26 will engage pin 170 carried by the pawl arm 171 and cause it to oscillate with the result that pawl 174 will impart a step by step clockwise movement (as viewed in Fig. 8) to switch segment 180 until switch 181 is closed. This oscillatory movement of arm 171 takes place through a range such that the arm 171 does not engage pin 192 during its oscillations so that the movement of the segment is unidirectional as described. If the record is of the type having a continuation of the spiral groove extending far inwardly towards the center, the movement of the segment to close the switch will take place in a single continuous movement.

Upon closure of switch 181 the operations involving a change of records commence. First, the solenoid 108 is energized, lifting plunger 106 and engaging clutch member 92 with 94 and thereby starting rotation of shaft 98 and cam disc 76. As the cam rotates pin 152 rides out of groove 150 and upon the periphery of the disc whereupon switch member 156 bridges contacts 158 closing the circuit through the solenoid independently of switch 181.

Shortly after the closure of 156, the link 124 reaches a position engaging and lifting the arm 26 thereby raising the needle 6 from the record. Continued movement of link 124 moves the tone arm in its raised position outwardly, movement being insured by engagement of lever 26 by the spring held detent 126.

As soon as the needle is raised from the topmost record, the roller 74 rides upon the portion 144 of the cam whereupon the lever 70 and the arm 80 rock as a unit under the action of spring 72 raising the disc 84 so that the stack of records is raised by table 4 under the action of spring 58 until the position illustrated in Fig. 14 is attained, wherein the topmost record is clear of the upper end of shaft 46 which is located somewhere between the faces of the second record. The clamping action on the stack prevents the topmost record from sliding off at this time.

The plunger 162 now rides upon cam 160 whereby it is moved to the right, as shown in Fig. 3, yieldingly engaging member 56 with disc 54 so that further upward movement of the turntable will be prevented by teeth 57, or at any rate only such very slight movement may occur as will cause the disc to interlock under one of the teeth.

The roller 74 now rides further inwardly upon cam surface 146 whereupon disc 84 is further raised. Since the turntable can no longer move upwardly, the top record will slide off the stack upon any records which may be located on the receiving surface 204, being clear of both the spindle and the disc, and free to slide off the table due to gravity and rotation. This occurrence is illustrated in Fig. 15. The second record is prevented from sliding off by reason of the holding action of the upper end of the shaft.

The roller 74 now rides upon surface 142 causing disc 84 to be again brought close to the end of shaft 46, forcing downwardly the stack of discs into the position illustrated in Fig. 13, the disc 54 riding downwardly over the teeth 57 which yield against the action of spring 166. The plunger 162 then rides off the cam 160 whereupon the plungers 162 and 164 move as a unit releasing disc 54 from teeth 57, so that the turntable may exert its normal upward pressure clamping the stack of records against disc 84.

During the above mentioned operations the tone arm will be moving towards the left as viewed in Fig. 4 under the action of link 124 and detent 126. The pin 170 and arm 171 will follow it to the left during this action under the influence of spring 172, the arm 171 first engaging pin 192 and thereby moving the segment 180 to open switch 181. The movement ceases with the parts in the position illustrated in Fig. 8 when the segment engages stop pin 190. The solenoid 108 remains energized through switch 156.

As the movement of the tone arm continues, the arm 26 engages the pin 130 in its adjusted position and is stopped thereby. The link 124 continues to move and the detent 126 yields against the action of spring 128. As the link 124 now has a downward component of movement, the needle drops into the beginning of the groove of the now uppermost record which is then played.

After the needle engages the record, the cam disc 76 will have completed one revolution and pin 152 drops into slot 150 opening the solenoid circuit and effecting a disengagement of clutch members 92 and 94 whereupon rotation of shaft 98 ceases with the parts in their original positions.

The arrangement in the present machine is preferably such that the last record of a stack will not be discharged and accordingly the playing of the last record will repeat indefinitely until the machine is manually turned off. This result is produced by so arranging the table that at its upward limit of movement the surface of the table 4 will be below the upper end of the pin 46 and accordingly, even though the disc 84 rises in the usual fashion to permit the discharge of a record, the last record will remain thereon, the tone arm being reset so as to repeat the playing thereof. However, even if the machine were arranged to discharge the last record, no harm would be done and the needle would not cut or destroy the friction surface on the top of the turntable, since the turntable is of less diameter than a record and after the playing of the last record the tone arm would be set down outside the periphery of the turntable, which would thereafter idly revolve. Since the tone arm would never move in toward the center the changing mechanism will remain inoperative.

It is to be noted that during the cycle of operations as just described, the turntable is continuously rotating, not only thereby insuring removal of the played record but also, along with the records carried by it, acting as a flywheel tending to relieve the motor of the increased load imposed at various moments during the changing operations.

While the machine may be stopped at any time to change records, the rejection of any record may be readily automatically effected by lifting the tone arm and setting it down at the end of the groove.

If, while maintaining both switches 194 and 196 closed, the latch 86 is adjusted to hold the arm 70 to the left as viewed in Fig. 3 so that the follower 74 cannot move inwardly under the action of spring 72 to follow cam surfaces 144 and 146, it will be impossible for disc 84 to move upwardly to release the top record, while at the same time the tone arm will move as described above after the completion of the playing of the record. Accordingly the mechanism will operate automatically to repeat the same record.

If switch 194 is closed and switch 196 left open, the machine will act as an ordinary phonograph playing one record and continuing to operate with the needle moving in the inner end of the groove. Obviously, if desired an automatic stop arrangement of usual form may be provided to take care of such operation.

If instead of the manual adjustment to take care of different sizes of records, the automatic means shown in Figs. 9 and 10 are used, the operation is in general the same as described above except for the stopping of the outward movement of the tone arm.

The feeler 212 becomes operative at the time when the disc 84 returns to its normal position adjacent the end of shaft 46. If there is a record of small size uppermost, the arm 210 is free to drop to its lowermost position causing contacts 214 and 216 to engage and thereby energize solenoid 216 raising plunger 218 and pin 222 into the path of arm 26 with the result that the needle is set down upon the record in the proper position to engage the beginning of the groove. If on the other hand a large size record is uppermost, contact will not be made at 214—216 since the feeler 212 engages the top of the record at its edge. Accordingly the solenoid will not be energized and the arm 26 will not be stopped until it engages pin 224 with the result that the needle will be properly positioned to engage the groove of the larger record. It will thus be seen that the mechanism is capable of automatically handling records of two different sizes mixed in the stack on the turntable.

The mechanism illustrated in Fig. 11 is a variation of details of the mechanism of Figs. 3 and 4 which makes unnecessary the provision of switch 156 and eliminates the necessity for prolonged excitation of solenoid 108. The cam 230 mounted on shaft 98 is arranged to move the pin 234 below the lifted lever 100 at the same period in the operation that switch 156 would normally be closed. Accordingly, even though solenoid 108 would be deenergized by opening of switch 181, the arm 100 could not drop to disengage the clutch until one revolution was completed and pin 234 dropped into depression 232. A one to one ratio of shafts 98 and 116 would be necessary if cam 230 were mounted on shaft 98. Of course it could be mounted on shaft 116, suitable connections being made to lever 100.

Figure 6:
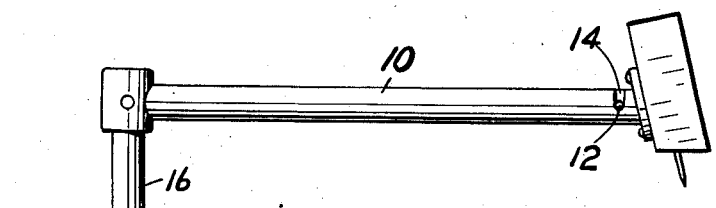
Fig. 6 is a front elevation of the subject of Fig. 5.

While there has been described primarily an automatic phonograph, there are various details constituting part of the invention which may be used in non-automatic phonographs, for example, the mounting arrangement of the tone arm illustrated in Figs. 5 and 6 wherein the tone arm is completely balanced and only such pressure is exerted to cause the needle to contact with the record as is necessary for proper performance. Undue wearing of the record is thus avoided.

Another feature which is also illustrated in Figs. 5 and 6 and which is of general application is the pivotal mounting of the pick-up on the tone arm whereby the pick-up may be readily adjusted to facilitate a change of needles.

Heretofore different types of stopping mechanisms have been provided in ordinary phonographs to stop their operation in the cases of the two types of records, one of which has the spiral groove extending far into the center and the other of which depends upon oscillation of the tone arm in an inner eccentric groove to effect stoppage. The switch arrangement illustrated in Figs. 7 and 8 will operate equally well under both types of operation, and the circuit closed thereby, or mechanical connections may be utilized to stop the phonograph.

Another element of the mechanism to which particular reference may be made is the clutch arrangement, best shown in Fig. 3. Since it is undesirable to use a large amount of power to throw the clutch, it has been necessary to provide a clutch arrangement which, while positive, will be quite readily operated. The arrangement which is disclosed performs the desired function, since the lever 100 is yieldingly urged through the medium of spring 104 so as to snap into engaging position as soon as the tooth carried by the element 92 passes the tooth carried by the element 94.

While the phonograph has been described in a preferred form in which an electrical pick-up is used, it is obvious that the pick-up may be of the mechanical variety, the supporting arm being suitably formed to carry the sound waves to the usual sound box. Such arrangement would necessitate, of course, of an arm of larger size and accordingly a different suitable type of pivotal mounting therefor.

What I claim and desire to protect by Letters Patent is:—

1. A phonograph including a pin arranged at an angle to the vertical with its free end uppermost, a turntable for supporting a plurality of records arranged in a stack for rotation about the axis of the pin, means yieldingly urging the turntable towards the free end of the pin, a member engaging the topmost record and cooperating with the turntable to clamp the stack of records, means for holding the turntable from upward movement, and means for raising the member while the turntable is so held to release the topmost record for movement from the stack.

2. A phonograph including a pin arranged at an angle to the vertical with its free end uppermost, a turntable for supporting a plurality of records arranged in a stack for rotation about the axis of the pin, means yieldingly urging the turntable towards the free end of the pin, a member engaging the topmost record and cooperating with the turntable to clamp the stack of records, means for raising said member whereby the turntable may move the stack to locate the topmost record clear of the pin, means for then holding the turntable from further upward movement, and means for then further raising the member to release the topmost record for movement from the stack.

3. A phonograph including a pin arranged at an angle to the vertical with its free end uppermost, a turntable for supporting a plurality of records arranged in a stack for rotation about the axis of the pin, means yieldingly urging the turntable towards the free end of the pin, a member engaging the topmost record and cooperating with the turntable to clamp the stack of records, means for raising said member whereby the turntable may move the stack to locate the topmost record clear of the pin, means for then holding the turntable from further upward movement, means for then further raising the member to release the topmost record for movement from the stack, and means operable to prevent raising of the member whereby the topmost record is restrained from discharge.

4. A phonograph including a turntable, a pivoted arm, a pickup unit mounted on the end of the arm to move towards and from and across the turntable, means balancing the overhanging weight of the arm and unit about the pivot, said arm having an upright portion adjacent the pivot, and a spring operated lever engaging said upright portion to engage a needle carried by the pickup unit with a record on the turntable.

5. A phonograph including a pin with its free end uppermost, a turntable for supporting a plurality of records arranged in a stack for rotation about the axis of the pin, means yieldingly urging the turntable towards the free end of the pin, a member engaging the topmost record and cooperating with the turntable to clamp the stack of records, means for holding the turntable from upward movement, and means for raising the member while the turntable is so held to release the topmost record for movement from the stack.

6. A phonograph including a pin with its free end uppermost, a turntable for supporting a plurality of records arranged in a stack for rotation about the axis of the pin, means yieldingly urging the turntable towards the free end of the pin, a member engaging the topmost record and cooperating with the turntable to clamp the stack of records, means for holding the turntable from upward movement, and means for raising the member while the turntable is so held to release the topmost record for movement from the stack, and means operable to prevent raising of the member whereby the topmost record is restrained from discharge.

7. A phonograph including a pin with its free end uppermost, a turntable for supporting a plurality of records arranged in a stack for rotation about the axis of the pin, a motor, connections between the turntable and motor whereby the turntable is driven continuously during operation of the motor, means yieldingly urging the turntable towards the free end of the pin, a member engaging the topmost record and cooperating with the turntable to clamp the stack of records, means for holding the turntable from upward movement, means for raising the member while the turntable is so held to release the topmost record for movement from the stack, and a clutch device for connection of the last named means to the motor for operation at the completion of the playing of a record.

8. A phonograph including a pin with its free end uppermost, a turntable for supporting a plurality of records arranged in a stack for rotation about the axis of the pin, a motor, connections between the turntable and motor whereby the turntable is driven continuously during operation of the motor, means yieldingly urging the turntable towards the free end of the pin, a member engaging the topmost record and cooperating with the turntable to clamp the stack of records, means for holding the turntable from upward movement, means for raising the member while the turntable is so held to release the topmost record for movement from the stack, and a clutch device for connection of the last named means to the motor for operation at the completion of the playing of a record, and means for manually controlling the clutch device during the playing of a record to actuate the last mentioned means.

9. A phonograph including a pin with its free end uppermost, a turntable for supporting a plurality of records arranged in a stack for rotation about the axis of the pin, a motor, connections between the turntable and motor whereby the turntable is driven continuously during operation of the motor, means yieldingly urging the turntable towards the free end of the pin, a member engaging the topmost record and cooperating with the turntable to clamp the stack of records, means for holding the turntable from upward movement, means for raising the member while the turntable is so held to release the topmost record for movement from the stack, and a clutch device for connection of the last named means to the motor for operation at the completion of the playing of a record, and a single revolution member adapted to disengage the clutch after each cycle of operation of said means.

10. A phonograph including a pin with its free end uppermost, a turntable for supporting a plurality of records arranged in a stack for rotation about the axis of the pin, means yieldingly urging the turntable towards the free end of the pin, a member engaging the topmost record and cooperating with the turntable to clamp the stack of records, means for holding the turntable from upward movement, means for effecting removal of records from the turntable including means for raising the member while the turntable is so held to release the topmost record for movement from the stack, and devices whereby the means for effecting removal of records may be rendered inoperative without disturbing the normal rotation of the turntable during playing of a record.

11. A phonograph including a pin with its free end uppermost, a turntable for supporting a plurality of records arranged in a stack for rotation about the axis of the pin, means for moving the turntable towards the free end of the pin, a member engaging the topmost record and cooperating with the turntable to clamp the stack of records, and means for raising the member to release the topmost record for movement from the stack.

12. A phonograph including a pin with its free end uppermost, a turntable for supporting a plurality of records arranged in a stack for rotation about the axis of the pin, a motor, connections between the turntable and motor whereby the turntable is driven continuously during operation of the motor, means for moving the turntable towards the free end of the pin, a member engaging the topmost record and cooperating with the turntable to clamp the stack of records, and means for raising the member to release the topmost record for movement from the stack, and a clutch device for connection of the last named means to the motor for operation at the completion of the playing of a record.

13. A phonograph including a pin with its free end uppermost, a turntable for supporting a plurality of records arranged in a stack for rotation about the axis of the pin, a motor, connections between the turntable and motor whereby the turntable is driven continuously during operation of the motor, means for moving the turntable towards the free end of the pin, a member engaging the topmost record and cooperating with the turntable to clamp the stack of records, and means for raising the member to release the topmost record for movement from the stack, and a clutch device for connection of the last named means to the motor for operation at the completion of the playing of a record, and a single revolution member adapted to disengage the clutch after each cycle of operation of said means.

GEORGE A. WHITE.